T. G. ORWIG.
Barbed-Fence.

No. 225,717. Patented Mar. 23, 1880.

Witnesses:
Frank W. Heers.
R. G. Orwig.

Inventor:
Thomas G. Orwig.

UNITED STATES PATENT OFFICE.

THOMAS G. ORWIG, OF DES MOINES, IOWA.

BARBED FENCE.

SPECIFICATION forming part of Letters Patent No. 225,717, dated March 23, 1880.

Application filed May 20, 1879.

*To all whom it may concern:*

Be it known that I, THOMAS G. ORWIG, of Des Moines, in the county of Polk and State of Iowa, have invented an Improved Barbed Fence, of which the following is a specification.

The object of my invention is to reduce the labor and expense of building fences and to overcome some objections to the barbed fences in use.

It consists in producing a strong, durable, efficient, and plainly-visible barbed fence by coupling barbed strips of wood together and to fixed posts, and thereby dispensing with metal rails.

When barbed wires, barbed-wire cables, and barbed metal straps are stretched from post to post they produce a fence that is not plainly visible, and animals frequently run against it accidentally and are seriously injured.

When plain wires are stretched from post to post and barbed wooden pickets or strips fastened thereto, as has heretofore been done to produce a barbed fence that is more plainly visible than barbed wire, about the same quantity of metal is required as in a barbed-wire fence, and the rails (plain wires) are subjected to an additional strain by the weight of the barbed wood which they support.

To make the use of metal rails unnecessary, and to avoid the expense, dangers, and accidents resulting from barbed-wire fences, I construct a flexible barbed fence, principally from wood, by coupling barbed strips together to form rails and panels that can be readily stretched between posts and fastened thereto in a manner similar to the ways by which barbed wires have been combined with a line of posts fixed in the ground.

Figure 1:
Figure 2:
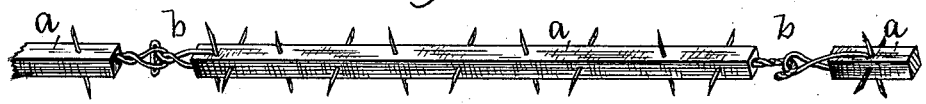

Figure 1 of my drawings is a perspective view of one of my complete barbed rail-sections adapted to be coupled to a corresponding section or a post. Fig. 2 shows three rail-sections connected as required to produce a continuous and flexible rail. Figs. 3, 4, 5, and 6 are detail views, showing coupling devices formed and applied in various ways.

Figure 3:
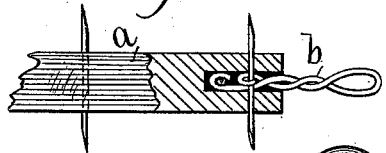

In Fig. 3 a bore in the end of the wood receives the end of the coupling that is fastened in the bore by means of barb-pieces being passed through the wood and also through hooks or eyes formed on the shank end of the coupling. Paint or other preserving material into which they are dipped runs into the bore and hardens there to aid in fastening and retaining the coupling securely in its place.

Figure 4:
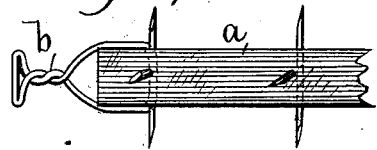

In Fig. 4 the ends of the coupling are passed through the wood from opposite sides and allowed to project to serve as barbs, or they may be clinched to be more securely fastened to the wood. A barb-piece passed through the wood in front of and at right angles to the ends of the coupling in the wood prevents those ends from tearing a passage through the wood when the coupling is subjected to a straining force.

Figure 5:

In Fig. 5 the front end of the coupling is doubled by a coil to strengthen the eye or loop, or the hook or cross-head that may be formed thereon, by simply pressing the ring into an elongated form.

Figure 6:

In Fig. 6 the coupling-wire is in the shape of a coiled spring screwed upon the ends of the wood until one or more of its coils has passed and engaged the projecting barbs.

Figure 7:
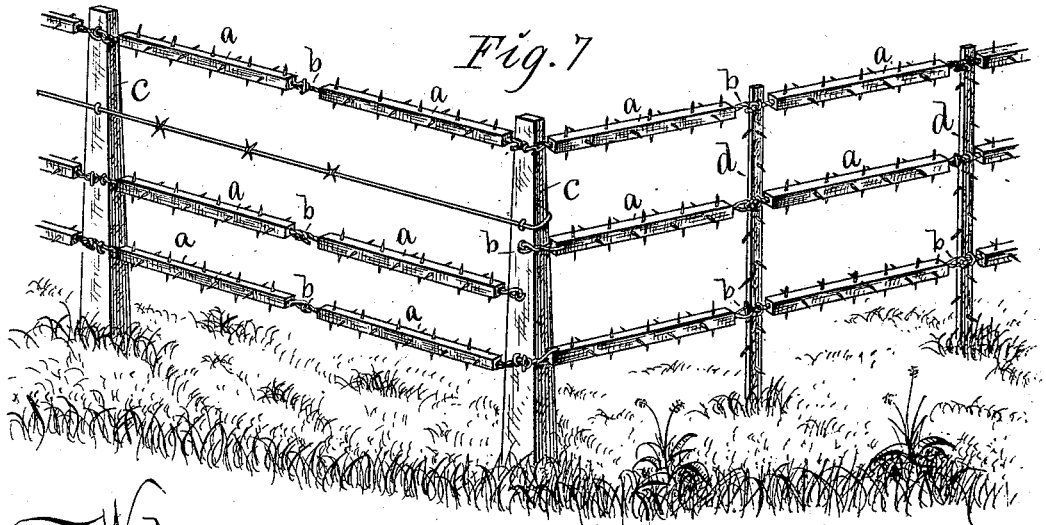

Fig. 7 is a perspective view of a section of my improved fence.

Jointly considered these figures illustrate the construction and operation of my complete invention.

*a* represents a strip of wood, preferably about one inch square and four feet long. It may be cut from any kind of wood desired by sawing or in any suitable way.

*b b* represent coupling devices fixed to the ends of the wooden rail-sections. They are made of pieces of wire or other suitable material, in various forms, and fastened to the ends of the wooden sections by fixing their ends in the wood in a transverse position in a longitudinal bore by coiling and clamping around the outside of the wood, or in any suitable way, so that they can be readily connected to form a flexible joint between two wooden rail-sections or a post.

Double-pointed nails or wire barb-pieces are fixed in the wooden rail-sections in any suitable way to produce barbs that will project at right angles from their sides, in such a manner that they will readily prick an animal when it comes in contact with the fence.

*c c c* represent a line of posts set in the ground. Two or more of my continuous and flexible barbed-wood rails, a b b, are attached to the fixed posts by means of staples, nails, or other suitable fastening devices to produce a fence. The posts are preferably set one rod apart, and auxiliary posts or vertical barbed-wood supporting-pieces d placed at every joint of the flexible rails and panels, and fastened thereto by means of staples placed astride of the couplings, and then driven into the wooden stays, or in any suitable way.

To stiffen and strengthen the flexible barbed-wood panels, I stretch plain or barbed fence-wires from post to post, and fasten them thereto to produce a combined wood and wire fence, in which the plain wire rails and the barbed wooden rails a' and vertical stays d will mutually aid in producing a very strong and plainly-visible barbed fence.

In the practical construction and operation of my invention I contemplate permeating and coating the barbed-wood rail-sections and the barbed-wood stay-pieces with coal-tar, asphaltum, paint, or other suitable preservative material, and then binding the pieces in bundles, so that they can be conveniently handled as an article of merchandise, and when they are distributed along a line of posts I take one piece at a time to build a fence therewith by combining them with the posts.

When I have fastened one of the rail-sections to one of the fixed posts I connect a second piece to the free end of the first by means of the couplings, and in this manner produce a continuous and flexible barbed-wood rail that is adapted to be stretched and fastened to the line of posts to produce a complete barbed-wood fence that is less expensive and more plainly visible than a barbed-wire fence.

When two or more barbed-wood rails are thus formed and stretched and fixed to the posts to produce a complete panel, the panel may be improved in appearance and strengthened by attaching the stays d at the joints, as hereinbefore stated; or two or more flexible rails may be formed and connected while flat upon the ground by means of the rigid stay-pieces d, to produce a flexible panel that can be readily turned up against the line of posts and fastened thereto to construct a complete fence.

Short, light, and frail strips of wood can be thus in various ways readily coupled together by means of metal loops, links, or other suitable fastenings that will allow the continuous rails and flexible panels to yield to pressure without breaking, and a neat, novel, strong, durable, and plainly-visible fence advantageously constructed to restrain animals and preserve field crops and to avoid the dangers and accidents incident to the use of barbed-wire fences that are practically invisible at times.

I am aware that sections of wire-fence material and sections of strap-iron fencing have been flexibly connected in various ways to form fence-rails adapted to be stretched between posts, and that strips of wood have been barbed and attached to plain wires stretched between posts to produce a visible barbed fence; but by my method of coupling barbed strips of wood together and to posts to produce flexible wooden rails and panels adapted to be stretched between posts I dispense with the use of metal rails, and thereby save in material, labor, and expense in the construction of a plainly-visible barbed fence.

I claim as my invention—

1. As a new article of manufacture, a barbed strip of wood having fastening devices at its ends, adapting it to be flexibly connected with a corresponding strip, link, vertical stay-piece, or a fixed post, for the purposes set forth.

2. The combination, with a barbed strip of wood, of the wires passed transversely through the wood and formed into projecting loops or eyes and hooks or cross-heads, substantially as shown and described, for the purpose of interlocking and coupling in the construction of a fence.

3. The combination of the horizontal wooden rail-sections having fastening devices or couplings on their ends and vertical stay-pieces d, to produce a flexible fence-panel.

THOMAS G. ORWIG.

Witnesses:
R. G. ORWIG,
FRANK W. HEERS.